United States Patent
Alessandrl et al.

(10) Patent No.: US 8,219,679 B2
(45) Date of Patent: Jul. 10, 2012

(54) DETECTION AND CONTROL OF PEER-TO-PEER COMMUNICATION

(75) Inventors: Dominique Alessandrl, Zurich (CH); Daniela Bourges-Waldegg, Rueschllkon (CH); James F. Riordan, Rueschllkon (CH); Diego M. Zambonl, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/280,350

(22) PCT Filed: Feb. 27, 2007

(86) PCT No.: PCT/IB2007/050625
§ 371 (c)(1),
(2), (4) Date: Sep. 3, 2008

(87) PCT Pub. No.: WO2007/099497
PCT Pub. Date: Sep. 7, 2007

(65) Prior Publication Data
US 2009/0037583 A1      Feb. 5, 2009

(30) Foreign Application Priority Data
Feb. 28, 2006   (EP) .................................... 06004049

(51) Int. Cl.
*G06F 15/173*      (2006.01)
(52) U.S. Cl. ........ 709/225; 709/223; 709/220; 709/240; 709/249; 709/227
(58) Field of Classification Search .................. 709/225, 709/223, 220, 240, 249, 227
See application file for complete search history.

(56) References Cited

U.S. PATENT DOCUMENTS

| | | | |
|---|---|---|---|
| 2002/0188657 A1* | 12/2002 | Traversat et al. | 709/201 |
| 2007/0141910 A1* | 6/2007 | Camino et al. | 439/610 |
| 2007/0171910 A1* | 7/2007 | Kumar | 370/392 |
| 2008/0028055 A1* | 1/2008 | Dolev et al. | 709/222 |
| 2010/0274850 A1* | 10/2010 | Mace et al. | 709/203 |

FOREIGN PATENT DOCUMENTS

| | | |
|---|---|---|
| CN | 1578249 | 2/2005 |
| JP | 10247946 A | 9/1998 |
| JP | 11122301 A | 4/1999 |

(Continued)

OTHER PUBLICATIONS

Eitaro Saito "Free Internet Telephone Service—Detailed Analyses of Skype—Revealing Three Wonders", Nikkei Network, Nikkei Business Publications, Inc., May 22, 2005, Iss.62, pp. 58-62, no English translation.

(Continued)

*Primary Examiner* — Lan-Dai T Truong
(74) *Attorney, Agent, or Firm* — Ido Tuchman; William J. Stock

(57) ABSTRACT

A method and apparatus are provided for detecting peer-to-peer communication on a data communication network, between an internal client machine within an internal address space and an external client machine. The method includes routing all messages addressed to internal client machines to an analysis device. The analysis device identifies messages pertaining to peer-to-peer communication and identifies the internal client machine to which the messages of a specified nature were addressed. The analysis device terminates the connection with the external client machine if the establishing of the peer-to-peer communication is in violation of a pre-determined internal network rule.

13 Claims, 4 Drawing Sheets

FOREIGN PATENT DOCUMENTS

| | | |
|---|---|---|
| JP | 2005039820 | 2/2005 |
| WO | WO2004107706 A1 | 12/2004 |

OTHER PUBLICATIONS

Masashi Ito et al "A Proposal and an Implementation of Voice over IP System Passing Trough Fire Wall" IPSJ SIG Technical Report, Information Processing Society of Japan, Mar. 23, 2005, vol. 2005, Iss.33, pp. 105-110, no English translation.

"Dangerous Aspects of IP Phone", Network Magazine, ASCII Corporation, Nov. 1, 2004, vol. 9, pp. 134-135, no English translation.

Yasutaka Otake et al, "Design and Implementation of a control method for VoIP on NAT environment", Proceedings of Multimedia, Distributed, Cooperative, and Mobile (DICOMO) Symposium, Ver. 1997-2006, Information Processing Society of Japan, Jul. 3, 2002, vol. 2002, Iss.9, pp. 1-4, no English translation.

\* cited by examiner

DETECTION AND CONTROL OF PEER-TO-PEER COMMUNICATION

CROSS-REFERENCE TO RELATED APPLICATIONS

This application claims priority under 35 U.S.C. §120 to PCT Application No. PCT/IB2007/050625 filed Feb. 27, 2007, which claims priority to European Patent Office (EPO) Application No. 06004049.0 filed Feb. 28, 2006.

TECHNICAL FIELD

This invention relates to the field of detecting peer-to-peer communication on a data communication network and particularly relates to detecting peer-to-peer communication across an intranet/Internet boundary.

BACKGROUND OF THE INVENTION

The Internet is a wide area data communication network formed from a plurality of interconnected data networks. In operation, the Internet facilitates data communication between a range of remotely situated data processing systems. Typically, end user data processing systems connected to the Internet are referred to as client data processing systems or clients. Similarly, data processing systems hosting web sites and services for access by end users via the Internet are referred to as server data processing systems or servers. There is a client-server relationship completed via the Internet between the end user data processing systems and the hosting data processing systems.

The Internet has become an important communication network for facilitating electronically effected commercial interactions between consumers, retailers, and service providers. Access to the Internet is typically provided to such entities via an Internet Service Provider (ISP). Each ISP typically operates an open network to which clients subscribe. Each client is provided with a unique Internet Protocol (IP) address on the network. Similarly, each server on the network is provided with a unique IP address. The network operated by the ISP is connected to the Internet via a dedicated data processing system usually referred to as a router. In operation, the router directs inbound communication traffic from the Internet to specified IP addresses on the network. Similarly, the router directs outbound communication traffic from the network in the direction of specified IP addresses on the Internet.

The term peer-to-peer applies to the broad category of applications and protocols where clients, or peers, in a network establish communication sessions directly with each other. In contrast, client-server applications assume that clients communicate only with known servers. A characteristic of peer-to-peer applications is therefore the symmetry of roles. While in a client-server architecture it is only the client who can initiate communication to the server, in a peer-to-peer architecture, communication can be initiated by any peer.

File-sharing applications such as KaZaA and BitTorrent are examples of peer-to-peer applications. They include mechanisms for finding resources and for peer address resolution, which are used before the actual file transfer takes place. Note that these applications do rely on a server for some functions e.g. initialization, but they eventually use peer-to-peer communication for both resource finding and data transfer. Other types of peer-to-peer applications include interactive games or video-conferencing eg. using RTP, Real-time Transport Protocol.

The asymmetry of roles in client-server applications, which are the majority of Internet applications, has had many implications in the way networks are architected. For example, a firewall used to secure an intranet is typically more permissive when communication is initiated internally ie. within the intranet, assuming that it is a client trying to contact an external server. Equally, a firewall used to secure an intranet typically blocks all traffic initiated externally, unless it is directed to a server for which an exception exists. Network Address Translation, NAT, mechanisms are used to share an external IP address among clients within an intranet. NAT mechanisms may follow a similar principle to the firewalls, namely, communication has to be initiated from within the intranet so that a mapping between an internal client, having an internal address, and an external client, having an external address, be established. As a consequence of such architecture, peer-to-peer communication across intranet/Internet boundaries is not straightforward. Peer-to-peer communication that is initiated by an external client may be blocked by firewalls and NATs, although it is possible to configure specific rules and port mappings to allow such peer-to-peer communication.

Recent widespread availability of broadband internet connections for home users has lead to increased residential usage of middleboxes. Middleboxes are usually a combination of firewall and NAT functionality. Where a peer is behind a middlebox, their private address is mapped to a public address. Peer-to-peer software developers have devised techniques for establishing data communication channels which traverse middleboxes without requiring manual configuration of the middlebox by the user. Generally, in order to establish such data communication channels, the first step is to determine a transport address to use for the peer-to-peer communication, and the second step is to traverse the middlebox.

It is known in the art to perform the first step by relying on an initial connection to a well known server. Peers can find about each other by, for example, using identifiers such as aliases in an instant messaging server. Then the two peers wanting to establish a peer-to-peer communication connect to the well known server and transmit their current transport addresses. The server's reply contains the other peer's address information. Note that the address information in this exchange generally includes both private and public addresses. Private addresses are included so that peer-to-peer communication can be established where both peers are in the same address space, since some NATs do not provide "loopback translation".

Generally the second step is performed using techniques such as e.g. User Datagram Protocol, UDP, hole punching technique, or others as described in "Peer-to-Peer communication across Network Address Translators" by B. Ford, P. Srisuresh and D. Kegel, USENIX Annual Technical Conference, Apr. 10-15, 2005. UDP hole punching technique works in the following way. When a first peer and a second peer "simultaneously" send each other a session initiation UDP packet, they continue sending it until a response packet is received. This is done using both the private and the public address. If the two peers are located in the same address space, the packet sent to the private address is accepted immediately, a response is sent and the peers can start communicating following the protocol specific to the application. If the first peer is located behind a middlebox, then the packet sent by the second peer to the first peer's private address is meaningless (and probably not even routed). However, because the first peer sent a packet with destination address set to the second peer's public address, the middlebox assumes that incoming packets from the second peer are part of a peer-topeer communication initiated internally. The packet sent by the second peer to the first peer's public address is therefore accepted, and it is noted that session initiation packets are retransmitted so as to account for cases where the endpoint is not yet opened when the first packet arrives. The same process occurs for the second peer.

The above described UDP hole punching technique only works with NATs that reuse port bindings for different invocations, and NATs/firewalls that open a UDP endpoint for receiving packets of an external peer when the same endpoint has been used for sending packets to that peer.

It is noted that UDP hole punching technique is not always successful due to the variety of middlebox behaviors. Although in many cases it does allow peering sessions to be established even when both peers are behind a middlebox.

Improper usage of peer-to-peer applications in enterprise networks is a problem with several negative consequences. Firstly, these applications introduce new traffic patterns which can impact performance and availability of the enterprise's networking resources. Significantly, they represent a legal risk and a potential security exposure. The former is due to possible copyright infringement claims associated to file-sharing; the latter is due to the danger of confidential information being inadvertently disclosed by misconfigured/malicious peer-to-peer software, and to the possible introduction of viruses contained in shared files.

Known approaches to tackling this problem are based on analyzing traffic statistics at the network boundaries, and generally rely on the usage of well-known peer-to-peer UDP and Transport Layer Protocol, TCP, ports. However, due to the dynamic nature of peer-to-peer networks and the increasingly sophisticated techniques to traverse controls such as firewalls, these approaches do not accurately detect and control peer-to-peer software.

It is an aim of the present invention to provide a system for detecting and controlling peer-to-peer communication across intranet/Internet boundaries. It is a further aim to provide local reporting of local problems. In addition the detection can be realized transparent to the internal and external peers.

SUMMARY OF THE INVENTION

According to a first aspect of the present invention there is provided a method for detecting peer-to-peer communication on a data communication network, between an internal client machine within an internal address space and an external client machine, the method comprising the steps of routing all messages from external client machines addressed to internal client machines to an analysis device, identifying messages of a specified nature, identifying the internal client machine to which the messages of a specified nature were addressed. The term specified nature is understood to mean that the message has a specific property or being of a predetermined type. The term internal is understood to refer to entities of and within an intranet, and the term external is understood to refer to entities outside of the intranet.

The messages of a specified nature may pertain to establishing a peer-to-peer communication between the internal client machine and the external client machine.

The steps of identifying messages of a specified nature and identifying the internal client machine may be performed by an analysis device located outside of the internal address space. Further, the address space of the internal client machine is routed to the analysis device and the analysis device may then spoof an exchange with the external client machine.

The first aspect of the invention further entails terminating the connection with the external client machine if the establishing of the peer-to-peer communication is in violation of a pre-determined internal network rule.

According to a second aspect of the present invention there is provided an apparatus for detecting peer-to-peer communication on a data communication network, between an internal client machine within an internal address space and an external client machine, the apparatus comprising a router for routing all messages from external client machines addressed to internal client machines to an analysis device, the analysis device including: a protocol handler for identifying messages of a specified nature and an analysis component for identifying the internal client machine to which the messages of a specified nature were addressed.

The analysis device may further comprise a policy database for determining whether the peer-to-peer communication is allowed for the identified internal client machine and terminating the connection with the external client machine if the peer-to-peer communication is in violation of a pre-determined internal network rule.

According to a third aspect of the present invention there is provided a computer program element comprising computer program code means which, when loaded in a processor of a data processing system, configures the processor to perform a method comprising the steps of routing all messages from external client machines addressed to internal client machines to an analysis device, identifying messages of a specified nature, identifying the internal client machine to which the messages of a specified nature were addressed.

According to a fourth aspect of the present invention there is provided a method of equipping a client system having an internal address space against peer-to-peer communication between an internal client machine within an internal address space and an external client machine, the method comprising the steps of connecting an analysis device to a router, routing all messages from external client machines addressed to internal client machines to an analysis device, identifying messages of a specified nature, identifying the internal client machine to which the messages of a specified nature were addressed.

BRIEF DESCRIPTION OF THE FIGURES

Embodiments of the present invention will now be described, by way of examples only, with reference to the accompanying drawings in which.

DESCRIPTION OF PREFERRED EMBODIMENTS

Figure 1:
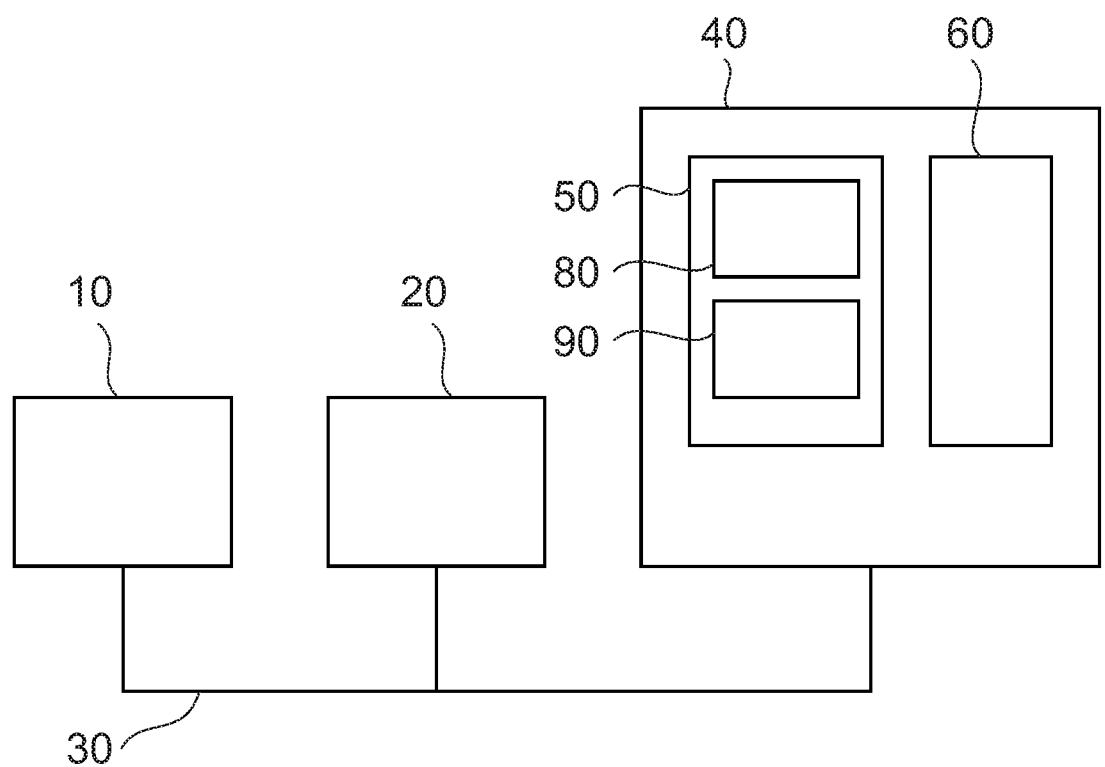
FIG. 1 is a block diagram of a data processing system.

Referring first to FIG. 1, a data processing system comprises a central processing unit (CPU) 10, an input/output (I/O) subsystem 20, and a memory subsystem 40, all interconnected by a bus subsystem 30. The memory subsystem 40 may comprise random access memory (RAM), read only memory (ROM), and one or more data storage devices such as hard disk drives, optical disk drives, and the like. The I/O subsystem 20 may comprise: a display; a printer; a keyboard; a pointing device such as a mouse, trackball, or the like; and one or more network connections permitting communication between the data processing system and one or more similar systems and/or peripheral devices via a data communication network. The combination of such systems and devices interconnected by such a network may itself form a distributed data processing system. Such distributed systems may be themselves interconnected by additional data communication networks.

In the memory subsystem 40 is stored data 60 and computer program code 50 executable by the CPU 10. The program code 50 includes operating system software 90 and application software 80. The operating system software 90, when executed by the CPU 10, provides a platform on which the application software 80 can be executed.

Figure 2:
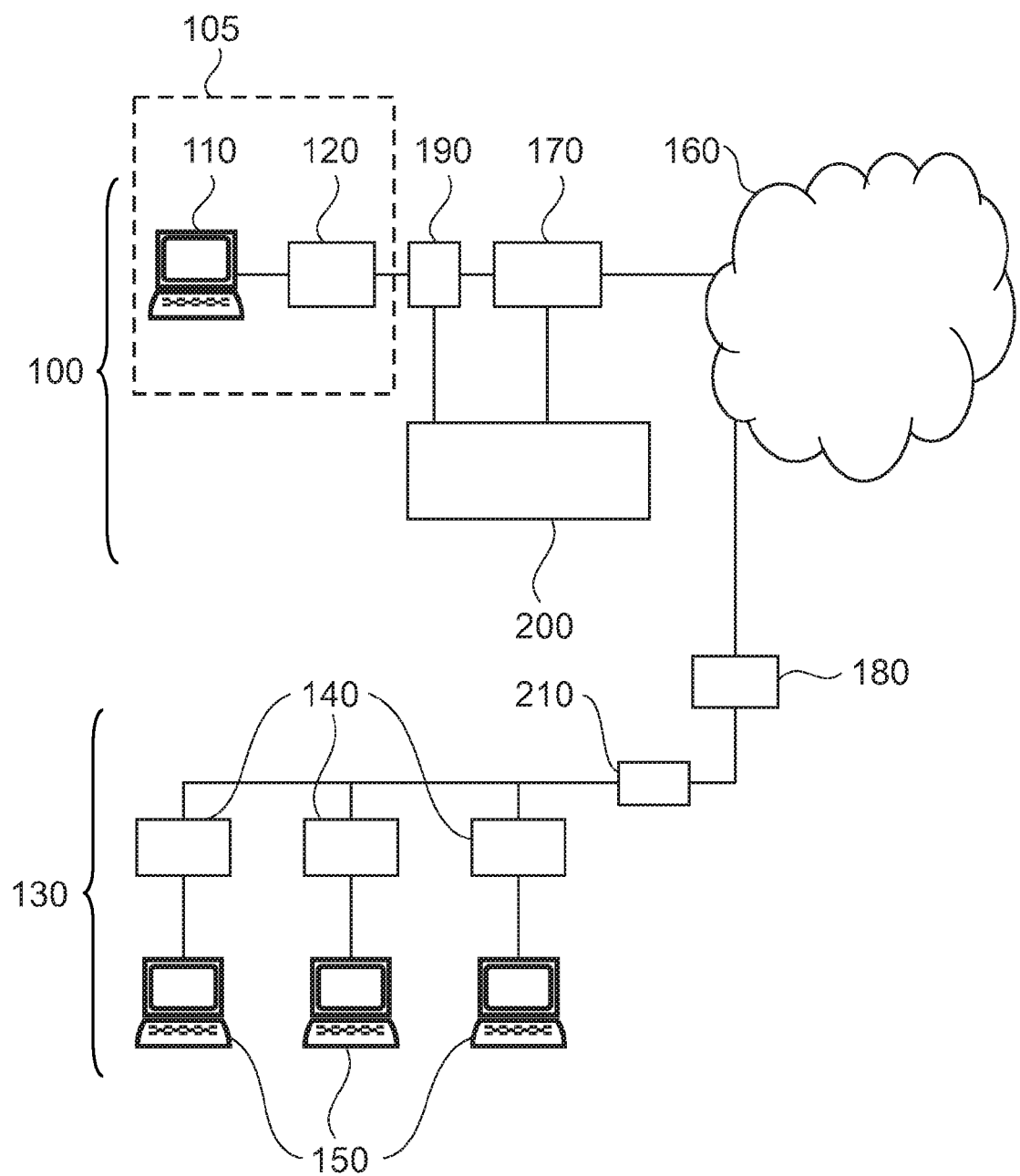
FIG. 2 is a block diagram of a data processing network in accordance with the present invention.

FIG. 2 shows, in a preferred embodiment of the present invention, there is provided a first data communication network 100 with a client data processing system, also referred to as an internal client machine 110 having an IP address 120 assigned, and a second data communication network 130 having a plurality of IP addresses 140 for assignment to a plurality of data processing systems 150. The first network 100 may be an intranet within a corporation, the intranet having an internal address space 105. The second network 130 may be in the form of an external network having Internet service installations. Each client data processing system 110, 150 may be a data processing system as herein before described with reference to FIG. 1. The networks 100, 130 are each connected to the Internet 160 via at least one router 170, 180.

The routers 170, 180 may be implemented in the form of a data processing system as herein before described with reference to FIG. 1 dedicated by appropriate programming to the task to route communication traffic in the form of data packets between the Internet 160 and the network 100, 130 to which the router 170, 180 is connected based on IP address data specified in the data packets.

A first firewall 190 is located between the intranet 100 and the first router 170. A peer-to-peer communication analysis device 200 is connected to the first router 170. A second firewall 210 is located between the external network 130 and the second router 180.

When an external client data processing system, also known as an external peer or external client machine, and an internal client data processing system, also known as an internal peer or internal client machine, intend to establish peer-to-peer communication, they initially contact each other via an out of bound mechanism eg. a server. During this initial contact the internal peer and external peer exchange addresses in a session initiation peer-to-peer protocol. Normally, an external client data processing system cannot know the address of an internal client data processing system due the firewall 190.

The address 120 of the internal peer 110 is routed externally to the analysis device 200. The trigger for this event is attempted contact from the second network 130 to client data processing system 110 which is not allowed by the current state of the firewall 190. The routing may occur via the firewall 190, in which case it could be considered to function as a router, although alternatively the routing may occur via first router 170. Furthermore, the first router 170 may alternatively be positioned between the firewall 190 and the internal peer 110.

Next, the external peer 150 attempts to establish direct contact with the internal peer 110 via the Internet. As all messages from external peers to internal peers are routed to the peer-to-peer communication analysis device 200, this contact attempt is re-routed at the first router 170 to peer-to-peer communication analysis device 200, also referred to as analysis device 200.

The peer-to-peer communication analysis device 200 responds via the Internet to the external peer 150 by posing one or more queries to establish the nature of the communication, also referred to as messages of a specified nature, received from the external peer. The external peer 150 calculates that these queries have been sent by the internal peer 110 rather than by the peer-to-peer communication analysis device 200. Preferably, the communication can take place implementing various peer-to-peer protocols. Once these protocols are implemented, they provide semantic layer information about the peer-to-peer communication.

Further, the peer-to-peer communication analysis device 200 communicates within the intranet 100 to identify the internal peer that intended to participate in the peer-to-peer communication. In this identification process the peer-to-peer communication analysis device 200 extracts the internal address 120 from the session initiation peer-to-peer protocol and to matches it to a corporate database of addresses, or to a dynamic address, held within the peer-to-peer communication analysis device 200. The corporate database also indicates the corporate policy, also referred to as a predetermined internal network rule, which covers that particular internal peer 110 and thus describes what type of communications the client data processing system 110 of internal address 120 has the right to perform ie. whether it can perform peer-to-peer communications. The semantic layer information can also be utilized in the determination of what type of communications the address 120 has the right to perform.

In FIG. 2 an example extract of an Internet architecture is shown with an embodiment of an analysis device. In the example architecture two data communication networks 100, 200 are shown. It will be appreciated that this is an example architecture and many different forms of data communication networks may be provided.

Figure 3:
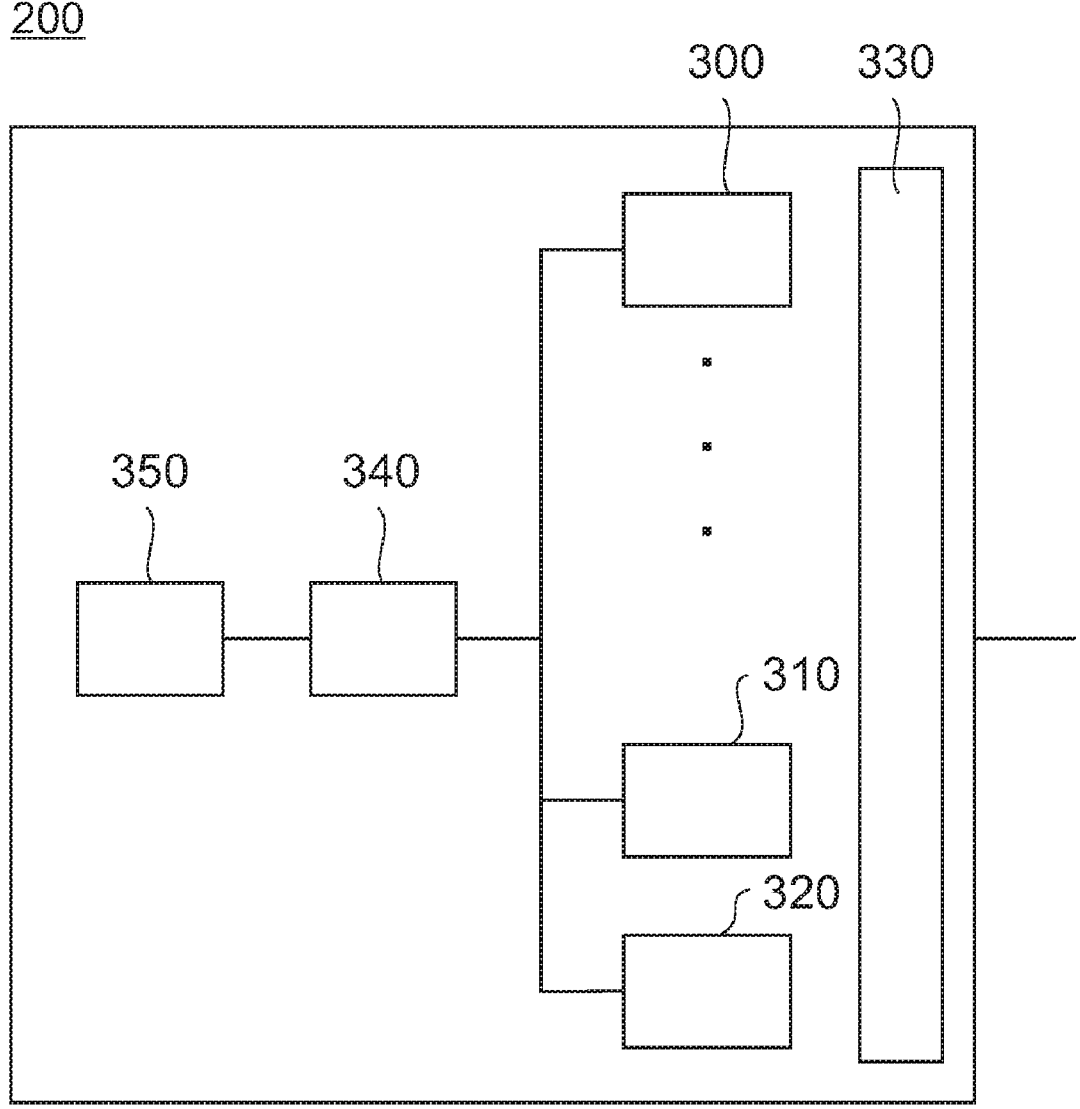
FIG. 3 is a block diagram of an analysis device in accordance with the present invention.

An example internal architecture of an analysis device is shown in more detail in FIG. 3. The analysis device 200 operates by spoofing the existence of a machine and service at one or more otherwise unreachable IP address 120. As those IP addresses 120 should not be being contacted, traffic destined to these addresses is a priori suspicious. The analysis device 200 spoofs peer-to-peer communications, rather than merely recording attempted connections, to determine the intention behind the traffic. Spoofing of peer-to-peer communications is done by means of configurable protocol handlers 300-320, one per peer-to-peer communication application to be detected.

The analysis device 200 is built on top of a security-hardened machine that offers no real services beyond restricted login. The analysis device 200 comprises a network virtualization infrastructure 330 that allows a plurality of individual protocol handlers 300-310 to be operated as if they were running on a single host. The individual protocol handlers 300-310 are each connected to a single analysis component 340 which, in turn, is connected to a corporate policy database 350. The corporate policy database 350 allows the analysis component 340 to determine if an incoming peer-to-peer communication is allowed for a specific address according to the corporate policy. Where it is not allowed, the analysis device instigates the termination of the connection.

The analysis device 200 may be constructed in order to detect one or more pre-determined peer-to-peer communication applications. Examples of such applications include 'bittorrent', 'kazaa' and 'edonkey'. The protocols of the predetermined peer-to-peer communication applications would be implemented by the individual protocol handlers 300-310.

Figure 4:
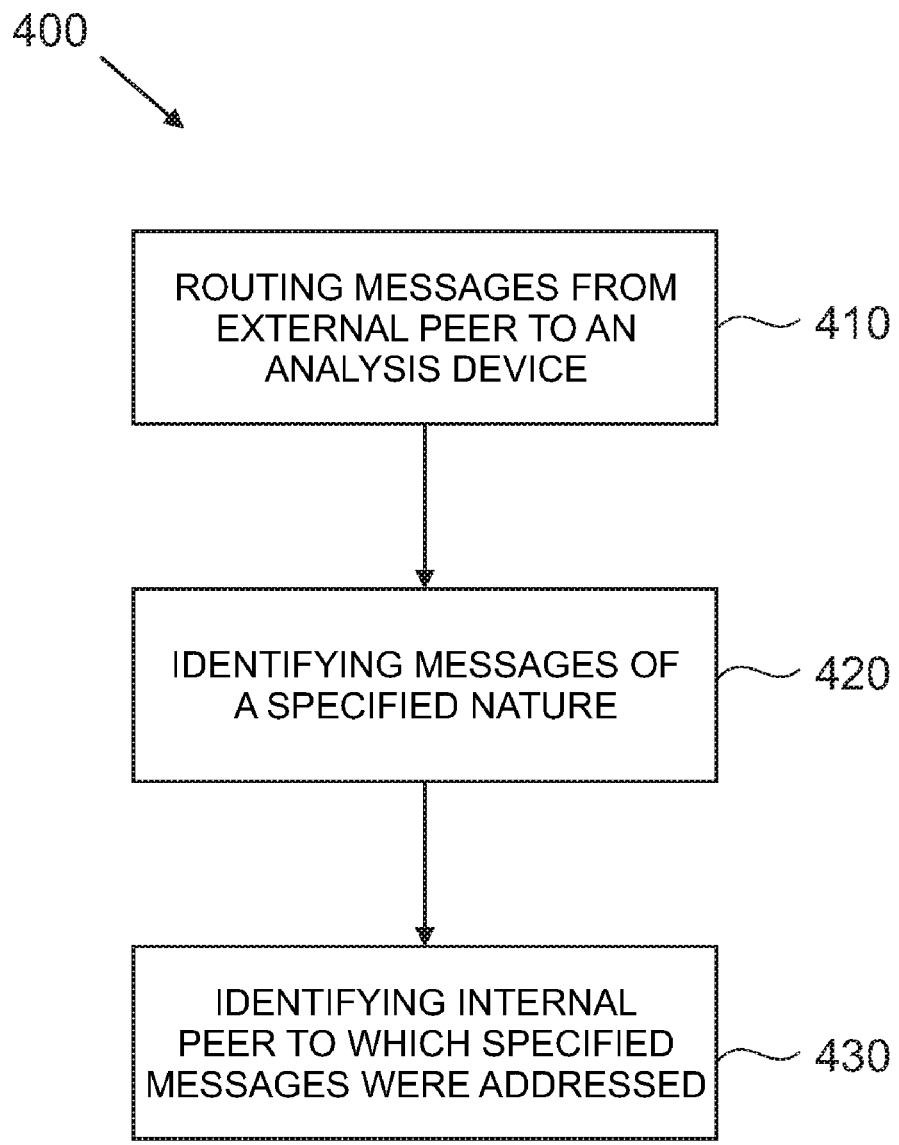
FIG. 4 is a flow diagram of the method of detection in accordance with the present invention.

FIG. 4 shows a flow diagram of the process of operation 400 of the analysis device 200. The process 400 involves routing 410 all messages addressed to internal client machines from external client machines to the analysis device 200, identifying 420 messages of a specified nature and identifying 430 the internal client machine to which the messages of a specified nature were addressed.

Thus, the system and method directly addresses the problem of detecting and controlling peer-to-peer communication across intranet/Internet boundaries. Through locating an analysis device at a router in close proximity to a corporation's intranet, local reporting of local peer-to-peer communication attempts is possible. Further advantage is found in this system because the detection of unauthorized peer-to-peer communication can be realized more transparent to the internal and external peers.

The method is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The system and method can also be realized by a servicing entity offering a service to a serviced entity, also referred to as client system. This service can be one or more of the following: Installation of the device or system according to the invention in or for an environment of the serviced entity, deployment of the infrastructure usable to perform thereon, in particular deployment or integration of computing infrastructure, comprising integrating computer-readable code into a computing system, wherein the code in combination with the computing system is capable of performing the method according to the invention. In the context of this invention, the servicing entity can equip a client system against unauthorized peer-to-peer communications across intranet/Internet boundaries. Thereby the servicing entity can provide more efficient detection of an internal peer attempting to engage in unauthorized peer-to-peer communications and also terminate the connection between internal and external peers.

The equipment method can comprise the steps of: connecting an analysis device to a router, routing all messages from external client machines addressed to internal client machines to an analysis device, identifying messages of a specified nature, and identifying the internal client machine to which the messages of a specified nature were addressed.

The analysis device 200 can be equipment owned or leased by the servicing entity. The servicing entity could use this analysis device 200 for several serviced entities at the same time, hence sharing this resource. This has the advantage that an update performed on the analysis device with respect to peer-to-peer detectability performance, has its impact on all connected serviced entities.

Another advantage is that this service can be realized more transparent to the serviced entity.

Improvements and modifications can be made to the foregoing without departing from the scope of the present invention.

The invention claimed is:

1. A method for detecting peer-to-peer communication on a data communication network, between an internal client machine within an internal network address space and an external client machine, the method comprising steps of:
routing all messages from external client machines addressed to internal client machines to an analysis device;
identifying by the analysis device messages of a specified nature, wherein the messages of the specified nature pertain to establishing a peer-to-peer communication between the internal client machine and the external client machine corresponding to communication policy, wherein the identifying the messages of a specified nature includes posing one or more queries to the external client machine over a plurality of peer-to-peer protocols; and
identifying the internal client machine to which the messages of a specified nature are addressed to;
spoofing a network address of the internal client machine by the analysis device to carry out an exchange with the external client machine; and
terminating, by the analysis device, connection with the external client machine if communication establishing of the peer-to-peer communication is in violation of a pre-determined internal network rule.

2. A method as claimed in claim 1, wherein the steps of identifying messages of a specified nature and identifying the internal client machine are performed by the analysis device located outside of the internal network address space.

3. A method as claimed in claim 2, further comprising:
routing the network address space of the internal client machine to the analysis device.

4. A method as claimed in claim 1, wherein the identifying messages of the specified nature includes determining by the analysis device if the peer-to-peer communication between the internal client machine and the external client machine is authorized within the internal network address space.

5. An apparatus for detecting peer-to-peer communication on a data communication network, between an internal client machine within an internal network address space and an external client machine, the apparatus comprising:
an analysis device;
a router, including a computer hardware processor, configured to routing all messages from external client machines addressed to internal client machines to the analysis device;
the analysis device including:
a protocol handler configured to identifying messages of a specified nature, wherein the messages of the specified nature pertain to establishing a peer-to-peer communication between the internal client machine and the external client machine corresponding to communication policy; and
the protocol handler configured to spoofing a network address of the internal client machine to carry out an exchange with the external client machine; and
an analysis component configured to identifying the internal client machine to which the messages of a specified nature are addressed to, and if the peer-to-peer communication between the internal client machine and the external client machine is authorized within the internal network address space, wherein the identifying the messages of a specified nature includes posing one or more queries to the external client machine over a plurality of peer-to-peer protocols;
the analysis device configured to terminating connection with the external client machine if the communication establishing of the peer-to-peer communication is in violation of a pre-determined internal network rule.

6. An apparatus as claimed in claim 5, wherein the analysis device is located outside of the internal network address space.

7. An apparatus as claimed in claim 6, wherein the router routes the network address space of the identified internal client machine to the analysis device.

8. An apparatus as claimed in claim 7, wherein the analysis device further comprises a policy database for determining whether the peer-to-peer communication is allowed for the identified internal client machine.

9. A computer program embodied in non-transitory storage medium which, when loaded in a processor of a data processing system, configures the processor to perform a method comprising steps of:
- routing all messages from external client machines addressed to internal client machines to an analysis device;
- identifying messages of a specified nature, wherein the messages of the specified nature pertain to establishing a peer-to-peer communication between the internal client machine and the external client machine corresponding to communication policy, wherein identifying the messages of the specified nature includes posing one or more queries to the external client machine over a plurality of peer-to-peer protocols;
- identifying the internal client machine to which the messages of a specified nature are addressed to;
- spoofing a network address of the internal client machine to carry out an exchange with the external client machine; and
- terminating connection with the external client machine if the establishing of the peer-to-peer communication is in violation of a pre-determined internal network rule.

10. A computer program as claimed in claim 9, wherein the method comprises;
- routing a network address space of the identified internal client machine to the analysis device.

11. A computer program as claimed in claim 9, wherein the identifying messages of the specified nature includes determining by the analysis device if the peer-to-peer communication between the internal client machine and the external client machine is authorized within the internal network address space.

12. A method of equipping a client system having an internal network address space against peer-to-peer communication between an internal client machine within the internal network address space and an external client machine, the method comprising the steps of:
- connecting an analysis device to a router;
- routing all messages from external client machines addressed to internal client machines to the analysis device;
- identifying by the analysis device messages of a specified nature, wherein the messages of the specified nature pertain to establishing a peer-to-peer communication between the internal client machine and the external client machine corresponding to communication policy, wherein identifying the messages of the specified nature includes posing one or more queries to the external client machine over a plurality of peer-to-peer protocols;
- identifying the internal client machine to which the messages of a specified nature are addressed to;
- spoofing a network address of the internal client machine by the analysis device to carry out an exchange with the external client machine; and
- terminating, by the analysis device, connection with the external client machine if the communication establishing of the peer-to-peer communication is in violation of a pre-determined internal network rule.

13. A method as claimed in claim 12, wherein the identifying messages of the specified nature includes determining by the analysis device if the peer-to-peer communication between the internal client machine and the external client machine is authorized within the internal network address space.

* * * * *